United States Patent [19]

Lopes et al.

[11] Patent Number: 4,681,714

[45] Date of Patent: Jul. 21, 1987

[54] MULTIPLE RELEASE MOLD COATING

[75] Inventors: William J. Lopes, Midland; Jerome M. Klosowski, Monitor Township, Bay County, both of Mich.

[73] Assignee: Dow Corning Corporation, Midland, Mich.

[21] Appl. No.: 813,886

[22] Filed: Dec. 27, 1985

[51] Int. Cl.$^4$ .................. B29C 33/64; B29C 67/20
[52] U.S. Cl. ................................ 264/46.6; 264/51; 264/338; 264/DIG. 77; 528/18; 528/34
[58] Field of Search ........ 264/46.6, 51, 338, DIG. 77; 427/133, 135; 528/18, 34

[56] References Cited

U.S. PATENT DOCUMENTS

| | | | |
|---|---|---|---|
| 2,811,408 | 10/1957 | Braley . | |
| 3,492,394 | 1/1970 | Heine | 264/297 |
| 3,532,624 | 10/1970 | Cekada | 252/28 |
| 3,554,910 | 1/1971 | Johnson | 252/49.5 |
| 3,579,469 | 5/1971 | Grenoble . | |
| 3,684,756 | 8/1972 | Brooks . | |
| 4,130,698 | 12/1978 | Sparrow et al. | 264/338 X |
| 4,244,912 | 1/1981 | Battice | 264/338 |
| 4,534,928 | 8/1985 | Martin | 264/334 |
| 4,551,516 | 11/1985 | Kitamura et al. | 528/33 X |

FOREIGN PATENT DOCUMENTS 624114   7/1961   Canada .............................. 264/338

*Primary Examiner*—Jeffery Thurlow
*Assistant Examiner*—Leo B. Tentoni
*Attorney, Agent, or Firm*—Christopher E. Blank

[57] ABSTRACT

A method for molding articles where a composition is used to treat at least one shape determining face of a mold to impart durable release characteristics to said face which last through multiple molding cycles. The compositions comprise by weight 20 parts of primarily hydroxyl endblocked polydimethylsiloxane, 2 to 10 parts of alkyltriacetoxysilane, 20 to 80 parts of nonreactive organic solvent, and, optionally, 0.001 to 2 parts organometallic catalyst.

11 Claims, No Drawings

MULTIPLE RELEASE MOLD COATING

FIELD OF THE INVENTION

This invention relates to compositions used to treat the shape determining faces of molds to render the molds relatively nonadhesive to the molded articles formed therein. The compositions used in the method of the invention are comprised of primarily hyrdroxyl end-blocked polydimethylsiloxane (I), alkyltriacetoxysilane cross-linker (II), and nonreactive organic solvent. Optionally, the compositions also comprise a condensation catalyst which decreases the time required to cure the film formed by the composition. The cured compositions are particularly useful in molding polyurethane foam articles by providing a nonreactive film on the surface of the shape determining portion of the mold that allows the treated mold to release molded articles through multiple molding cycles, and which does not defoam the surface of the molded polyurethane foam articles.

BACKGROUND OF THE INVENTION

One of the long recognized problems associated with molding articles is the adhesion of the molded article to the mold upon completion of the form determining process. Adhesion between the molded article and mold decreases the efficiency of manufacturing molded articles by requiring more force and time to remove the molded article from the mold. Often the molded article is so tenaciously adhered that separation of the article from the mold damages the surface of the molded product.

While adhesion is not completely understood, at least two types of adhesion can be identified which account for the adhesion of molded articles to molds. First, the process of molding intrinsically produces an intimate physical fit between the molded article and mold which requires some additional force to overcome. The second type of adhesion occurs when chemically curing the molding material is part of the molding process. Quite often the chemicals involved in cure mechanisms are aggressive adhesives, for instance, in molding polyurethane isocyanates are used as part of the resin forming process. These aggressive adhesives interact with the surface of the mold to form a chemical bond between the mold and the molded article.

Both types of adhesion can be minimized. Where adhesion is mainly attributable to the intimate physical contact between the molded article and mold, a fluid or flexible material disposed between the mold and molded article allows easier release of the article from the mold. Where chemical adhesion is present, the provision of a chemically inert mold surface decreases the chemical adhesion of the molded material to the mold surface.

Cured and uncured organosilicon materials have been used for a number of years as mold release agents. Uncured silicone materials have been used extensively in molding applications, but in the polyurethane foam molding applications such materials are undesirable because they transfer into the polyurethane reagents, and defoam the polyurethane foam.

Cured silicone compositions do not transfer into the molding materials, and are thus very useful in foam molding applications. However, many cured compositions do not adhere to the mold sufficiently to allow the mold to be reused without recoating, or are not sufficiently hard to resist the abrasions which occur during the molding process. Often materials which provide sufficient abrasion resistance have been found to cure so slowly that their application is impractical given the constraints of typical manufacturing techniques. Other compositions have been found to interact with the molding composition in such a way that the mold release characteristics of the cured silicone composition rapidly deteriorate.

U.S. Pat. No. 2,639,213 issued to Barth discloses the use of liquefied gas in silicone based oil as a mold release agent. Like most uncured systems, this release agent will defoam molded foams as will the mold release agents containing silicone described in U.S. Pat. No. 2,811,408 issued to Braley which describes a composition comprising a polysiloxane resin, and a polysiloxane oil which is useful in molding organic and organosilicon plastic articles.

U.S. Pat. No. 3,552,202 issued to Wada, et al. discloses a composition comprising $\alpha\omega$ hydroxyl end-blocked polydimethylsiloxane, polymethylhydrogensiloxane and polymethylphenylsiloxane. The mixture is claimed to form a film upon application to a surface which provides nonsticky surfaces to sticky materials.

U.S. Pat. No. 3,492,394 issued to Heine illustrates the organic solvent solutions of perfluoroalkyltrialkoxy silane to form durable mold release films. Heine speculates that the hydrolyzable groups react with the adventitious water and the mold surface to form a cured film.

U.S. Pat. No. 3,624,190 issued to Cekada, et al., discloses the use of polydimethylsiloxane fluid in conjunction with "typical release agents" to provide effective release coatings for polyurethane foam mold applications. The polydimethylsiloxane fluid is not cured in this composition, and its release into the molding reagent defoams certain polyurethane formulations.

Oppliger, Canadian Pat. No. 624,114, teaches that cured films of polysiloxane oils or gums act as release coatings in polyurethane foam molding applications. Oppliger does not teach that these films give multiple releases, and the examples and the compositions taught, and materials claimed in fact do not give multiple releases of molded polyurethane foam articles.

U.S. Pat. No. 3,634,764 issued to Brooks discloses a release coating composition comprised of methyl-terminated polydimethylsiloxane, partially methoxylated polymethylpropylsiloxane resin, and curing agent such as tetraalkyltitinates or metal salts of carboxylic acids. The polydimethylsiloxane is not cured in this coating and intermixes with the molded material. In polyurethane foam applications the uncured polydimethylsiloxane intermixes with the molding material, defoams the surface of the molded article, and forms an undesirable skin.

U.S. Pat. No. 4,244,912 issued to Battice teaches that a composition comprised of vinyl end-blocked polydimethylsiloxane, vinyl group containing polysiloxane resin, polymethylhydrogensiloxane cross-linking agent, and a platinum containing hydrosilation catalyst is useful as a multiple release coating. This coating gives multiple releases of molded polyurethane foam articles, and does not defoam the surface of such articles. The coating is difficult to recoat, however, because the cure system is inhibited by amines. Providing new cured coatings over spent coatings is difficult to insure in practice.

U.S. Pat. No. 4,534,928 issued to Martin teaches multiple release coatings for polyurethane foam molding applications comprised of predominantly hydroxyl terminated polydimethylsiloxanes; trialkoxysilane; metal alkoxides; and nonreactive organic solvent. This composition is applied to a mold surface, the solvent is driven off, and a cured film is formed which has multiple release properties. The coating defoams the surface of certain formulations of polyurethane foam molded articles.

U.S. Pat. No. 3,579,469 issued to Grenoble discloses a paper release coating comprised of a silanol terminated siloxane gum; a silane of the formula, $HSiX_3$, where X is a hydrolyzable group; a metal salt of an organic acid; and a nonreactive organic solvent. This composition is not taught to be a mold release composition.

It is an object of this invention to provide an organosilicone coating which permits multiple releases of molded articles between successive applications of the coating. It is also an object of the invention to provide a mold coating which provides multiple releases of molded polyurethane foam articles. It is a further object of this invention to provide mold release coatings which do not defoam the surface of molded polyurethane foam articles and which may be readily recoated. Finally, it is an object of the invention to provide a mold coating with multiple release characteristics in molded polyurethane foam applications which cures to a nontacky state in less than ten minutes.

SUMMARY OF THE INVENTION

The present invention relates to a composition that is particularly useful in treating the shape determining portions of molds to render those portions nonadhesive to the articles molded thereby, which composition comprises primarily α-ω dihydroxyl endblocked polydimethylsiloxane, alkyltriacetoxysilane and nonreactive organic solvent. The composition is useful in coating the inner surfaces of molds, and when cured imparts significant and durable release characteristics to the mold. The cured coating is inert to the chemical reactions used to make polyurethane foams, and, generally, does not transfer into molding materials.

The compositions of the invention are easily cured with only moderate temperatures being required to evaporate the nonreactive solvent from the compositions to form cured films. The resulting films provide durable release characteristics to the treated mold surfaces which remains through multiple molding cycles. Therefore, molds treated with the composition can be used several times before the surface of the mold needs to be recoated.

The addition of catalysts to the composition decreases the time required to cure the films, and also produces films which are more abrasion resistant than the noncatalyzed composition films.

The molecular weight of the polydimethylsiloxanes used in the composition can vary widely. Polydimethylsiloxanes fluids with degrees of polymerization of about 25 can be used as well as high molecular weight polydimethylsiloxane gums. Mixtures of high and low molecular weight polymers are preferred.

In coating a mold with the composition the mold may be preheated before the composition is applied, or heated after application, in order to evaporate the organic solvent and form a cured resin film on the shape determining faces of the mold.

DETAILED DESCRIPTION OF THE INVENTION

This invention relates to novel compositions of curable organosilicon, and to the use of films formed by the curing of said compositions as mold release coatings. The compositions when used to coat shape determining surfaces of molds allow molded articles to be easily removed from the mold after completion of the molding process. The compositions encompassed by the invention are comprised of primarily α-ω hydroxyl endblocked polydimethylsiloxanes; alkyltriacetsoxysilane; nonreactive organic solvent; and, optionally, a catalyst which promotes polymerization of the composition.

The polydimethylsiloxanes (I) of the composition are represented by the general formula

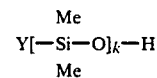

in which Y denotes a hydroxyl or a methyl radical, but 80% of all Y groups are hydroxyl radicals, and k has an average value of at least about 25.

The polydimethylsiloxanes (I) of the composition are well known hydroxylated siloxanes that can be prepared by conventional methods, for example, by condensation polymerization of organosilanes.

The average chain length of the siloxane polymer is not critical as long it has an average degree of polymerization of at least about 25. There is no upper limit on the average number of siloxane units in the polymer chain. Nonflowable hydroxylated siloxane gums as well as hydroxylated siloxane fluids are encompassed within the description of the hydroxyl endblocked polydimethylsiloxanes of the invention. However, fluids are preferred over high molecular weight gums.

Mixtures of high molecular weight and low molecular weight hydroxylated siloxane polymers are also within the scope of the invention, and in fact are the most preferred embodiment. A preferred mixture of siloxane polymers contains a polymer of formula (I), which has an average k between 25 and 80, and a polymer also represented by formula (I) which has an average k between 300 and 1000. Preferably, the ratio of high molecular weight polymer to low molecular weight polymer by weight is between about 0.1 and about 10. Most preferably, the high molecular weight polymer comprises at least two-thirds of the mixture, with about 80 to 90 percent levels being optimal.

The alkyltriacetoxysilanes (II) used in the invention are of the general formula $RSi(OAc)_3$ where R denotes a methyl, ethyl, or propyl radical, and OAc denotes an acetoxy radical. Preferably, mixtures of ethyltriacetoxysilane and methyltriacetoxysilane are employed in the invention. These silanes are available commercially, and their preparation is known in the art.

The mold release compositions of this invention also contain an organic solvent which serves to reduce the viscosity of the composition and facilitate the application of the composition to the shape-determining surfaces of a mold. Solvents which are to some extent hydrophobic are additionally advantageous because they facilitate the exclusion of moisture from the compositions and help prevent premature curing during storage.

Any organic solvent that is nonreactive with the other components of the invention, and sufficiently volatile to evaporate rapidly when applied to the mold surface can be employed in the invention. Generally, the preferred solvents have normal boiling points below about 150° C. The preferred solvent for use in any particular molding operation will depend on whether the mold release composition is applied to the molds at room temperature, or at elevated temperatures. When room temperature molds are coated a lower boiling solvent is generally preferred. On the other hand, it is advantageous to use higher boiling solvents when the molds are coated at elevated temperatures.

The nonreactive organic solvent should be substantially water free to avoid premature curing of the composition. Preferred organic solvents include, for example, aliphatic hydrocarbons, cycloaliphatic hydrocarbons, aromatic hydrocarbons and chlorinated hydrocarbons. Commercial mixtures such as white spirit, mineral spirits, and naphtha are also suitable. Further examples of useful solvents include cyclohexane, toluene, xylene, methylene chloride, methylene dichloride, ethylene dichloride, carbon tetrachloride, chloroform and perchloroethylene. Other solvents such as acetone, methylethylketone, ethyl acetate and tetrahydrofuran, and dioxane can also be used, but are less preferred because of their somewhat more hydrophilic character.

Since the solvent is nonreactive, it can be employed in the compositions in essentially any proportion. Generally, it has been found that compositions containing at least about 50 percent by weight solvent are advantageous because they are easy to apply to the mold surfaces and provide films of the appropriate thickness with good permanence.

For the purposes of this invention the curing catalyst, when employed, can be any of those condensation catalysts that decrease the time required to cure the mixture of the hydroxyl end-blocked polydimethylsiloxane and the alkyltriacetoxysilane cross-linker.

Such condensation catalysts include organometallic materials like the carboxylic acid salts of metals such as tin, manganese, iron, cobalt, nickel, lead, and the like, or titinates such as alkyl titinates, acyltitinates, or the corresponding zirconates. The catalysts preferably employed in the invention are the tin salts of carboxylic acids, or the mercapto tin salts. In particular, these catalysts include, but are not limited to, dibutyltindiacetate, dibutyltindilaurate, dibutyltindioctoate, stannous octoate, dimethyl-tindineodeconoate, di-N-octyltin-S,S-di-iso-octylmercapto acetate, dibutyltin-S,S-dimethylmercapto acetate, or diethyltin-S, S-dibutylmercapto acetate. The catalysts can be incorporated into the invention compositions in between 0.01 to 2 parts by weight to 100 parts of (I) and (II).

The proportions of hydroxyl end-blocked siloxane polymer (I), silane (II), and catalyst vary widely. The compositions without catalysts preferably have alkyltriacetoxysilane to polymer ratios of at least 1:5 by weight. Higher ratios of silane to polymer improve the release characteristics of the cured films. Even compositions with equal parts by weight of alkyltriacetoxysilane to siloxane polymer gave multiple releases of polyurethane foam articles.

Compositions without catalyst produce tacky films when baked for about 5 minutes at 100° F. However, these tacky films give multiple releases of molded polyurethane foam articles when at least a certain proportion of alkyltriacetoxysilane to siloxane polymer exists.

In general, films made from compositions with alkyltriacetoxysilane to siloxane polymer ratios greater than 1:5 were preferred when no catalyst is present in the composition.

In compositions with catalyst the proportion of (II) to (I) can be lower than the proportions used in the noncatalyst compositions. As little as 1 part of the silane cross-linker (II) can be used per 20 parts of a primarily hydroxyl endblocked polydimethylsiloxane mixture of high molecular weight polymer and low molecular weight polymer to provide a multiple release coating.

The catalyst decreases the time required to cure the composition to a nontacky film. Compositions without catalyst remain tacky for extended periods, while catalyst containing compositions cure in less than five minutes on molds surfaces heated to about 100° F. The cured catalyst containing films were also more abrasion resistant than the cured noncatalyzed compositions, and gave more releases than the noncatalyzed coatings with the same level of alkyltriacetoxysilane.

A preferred composition comprises 11.3 parts of a hydroxyl end-blocked dimethylsiloxane polymer with an average molecular weight of about 28,000; 2 parts of a hydroxyl end-blocked dimethylsiloxane polymer with an average molecular weight of about 2,000; 6.7 parts of a 50:50 mixture of ethyltriacetoxysilane and methyltriacetoxysilane; 0.1 part dibutyltindiacetate; and 80 parts naptha solvent.

The preferred compositions cure rapidly to form nontacky films upon application to heated mold surfaces. The resulting films allow the molds to be reused several times before recoating is necessary. Molded polyurethane foam articles produced using molds treated with the preferred compositions have smooth surfaces which show no evidence of defoaming.

The compositions may also include components which do not interfere with film formation. For instance, a colorant could be added to the composition to indicate where the composition had been applied.

The compositions can be prepared by mixing the siloxane polymer with the nonreactive organic solvent. The alkyltriacetoxysilane is then added to this solution. The alkyltriacetoxysilane may be added to the nonreactive organic solvent, and then mixed with the siloxane polymer. The catalyst is added to the siloxane polymer because of limited solubility of the catalyst in many organic solvents, but it is not essential that the composition be made in this precise manner.

All of the components should be free of water, however, no extraordinary precautions need be taken. Typically, all that is required is that the organic solvent be relatively water free. The large excess of alkyltriacetoxysilane stabilizes the composition to the presence of minute quantities of water and obviates the need for using special equipment.

The nature of the products formed by curing the composition is not precisely known, but it is believed that the silane acts as a cross-linker by reacting with the terminal hydroxyl radicals of the polysiloxane. In the presence of water further hydrolysis and condensation occurs forming a resin with the elimination of acetic acid. It is not clear what the role of the excess silane is, but the excess is necessary to impart release characteristics to the film. The preceding discussion should not be understood as limiting the scope of the invention to these proposed reactions.

The composition is stable when mixed with solvent, particularly the composition without a catalyst, and can be stored for extended periods before being used. The composition can be applied to mold surfaces by any suitable means such as spraying, brushing, dipping, or rolling. After application the composition should be cured by heating in the presence of atmospheric moisture and the organic solvent allowed to evaporate. The resulting film has release characteristics even while still tacky.

The composition can be used to coat molds in a variety of molding applications including polyurethane foam wherein the isocyanate used in the polyurethane foam is chosen from the group consisting of methylene diphenyl isocyanates (MDI), tolylenediisocyanates (TDI), or polymeric isocyanates (PMDI), as well as other chemically cured molding material applications.

EXAMPLES

The following examples are illustrative of the invention and should not be construed as being an exhaustive list of the embodiments of the invention. For this disclosure all viscosities were measured at 25° C., and all parts, ratios, and percentages are reported by weight.

EXAMPLE 1

This example illustrates the importance of using a sufficient proportion of alkyltriacetoxysilane crosslinker to hydroxyl end-blocked polydimethylsiloxane.

The following table summarizes the effect of the proportion of silane on the cured compositions multiple release capabilities. In the first two Examples, A and A1, 20 g of hydroxyl end-blocked polydimethylsiloxane with a viscosity of about 2,000 centistokes (equivalent to a degree of polymerization of about 300) were mixed with the indicated amount of alkyltriacetoxysilane (equal parts by weight of methyl- and ethyl-triacetoxysilane), and 85 parts of methylene chloride. This mixture was sprayed on the interior of a hot (140° F.) aluminum box mold and allowed to cure at the indicated conditions. Polyurethane molding material of a commercially used formulation was placed in the treated mold and the mixture was allowed to foam cure at 140° F. for 5-8 minutes. The molded article was removed and the mold was reused repeatedly until the molded article could not be removed, or showed surface defects.

Samples B, B1 and B2 were made by mixing 20 g of a mixture, comprised of 17 parts of a hyrdroxyl end-blocked polydimethylsiloxane with an average molecular weight of about 28,000 and 3 parts of a hydroxyl end-blocked polymer with an average molecular weight of about 2,000, with the amount of alkyltriacetoxysilane (x-linker) indicated in Table 1 below, and 85 g of methylene chloride. The alkyltriacetoxysilane mixture comprised equal weights of ethyl- and methyl- triacetoxysilane.

This mixture was applied to the shape determining faces of an aluminum box mold and allowed to cure at the indicated conditions.

TABLE 1

| Sample | Wt. Polymer | x-Linker | Time Cured | Temp. Cured | No. Releases |
|---|---|---|---|---|---|
| A | 20 g | 1 g | 30 | 140° F. | 0 |
| A1 | 20 g | 10 g | 15 | 140° F. | 14 |
| B | 20 g | 10 g | 05 | 100° F. | 25 |
| B1 | 20 g | 15 g | 05 | 100° F. | 30 |
| B2 | 20 g | 20 g | 05 | 100° F. | 32 |

The films were cured at the temperatures for the times indicated in the table. Samples A1, B, B1, and B2 recoated the mold and gave multiple release characteristics to the recoated mold. Sample A, having a x-linker/polymer wt. ratio of less than 0.2 and no catalyst gave no releases while those samples (A1, B, B1 and B2) having x-linker/polymer ratios greater than 0.2 gave multiple releases.

EXAMPLE 2

The effect of using a condensation catalyst on the multiple release characteristics of a cured film of the invention is illustrated by this example. A 15 g portion of a mixture used in Sample B of Example 1 was mixed with 25 g of naptha solvent indicated in the table. Portions of the compositions were applied to a hot aluminum mold, and cured. The molds were then used to mold polyurethane foam articles using a commercially employed formulation. The cured films gave multiple releases of the molded polyurethane foam articles. The results are summarized in Table 2.

TABLE 2

| TACK FREE TIME WITH CATALYST | | | | |
|---|---|---|---|---|
| Polymer | Silane | Tack Free Time | % Catalyst | No. Releases |
| 20 g | 10 g | — | 0 | 27 |
| 20 g | 10 g | 5 minutes | 0.03 | 27 |
| 20 g | 10 g | 3.5 minutes | 0.1 | 43 |

At a catalyst concentration of 0.03% significant multiple release characteristics were observed. Tack free time is the time required after application to the mold surface before the coating is no longer tacky. Nontacky films are less susceptible to abrasions and are preferred where abrasion resistance is important in the molding application.

EXAMPLE 3

The effect of silane to polymer ratio using condensation catalysts is illustrated in this example. 20 g of the polymer blend used in Samples B, B1 and B2 of Example 1, and the indicated amount of the alkyltriacetoxysilane mixture of Example 1 were mixed with 80 g of naptha solvent and the condensation catalyst dimethyltindineodeconoate, and a portion of the mixture was applied to the shape determining faces of an aluminum box mold. Polyurethane molding material was placed in the treated mold and foam cured at 140° F. for 5 to 8 minutes.

TABLE 3

| Polymer | Silane | Tack Free Time | No. Releases |
|---|---|---|---|
| 20 g | 2.5 g | 0.75 min. | 37 |
| 20 g | 5 g | 2.5 min. | 47 |
| 20 g | 10 g | 3.5 min. | 43 |
| 20 g | 15 g | 4 min. | 35 |

All samples had 0.1% by total solids weight of the condensation catalyst.

EXAMPLE 4

The average molecular weight of the siloxane polymer used in the compositions effects the release characteristics of the films formed from the compositions. The following table shows that low viscosity fluids to gum-like polymers can be used in the compositions used in the invention to form films which have multiple release characteristics. 20 g of polydimethylsiloxane polymer, 10 g alkyltriacetoxysilane, and 80 g of solvent were mixed and a portion of the mixture was applied to the shape determining surface of a mold. The treated mold was used to mold polyurethane foam articles. All of the films gave multiple releases of molded polyurethane articles as shown in the table below.

TABLE 4

Viscosity v. Releases

| Siloxane Polymer Viscosity | No. of Releases |
|---|---|
| 2,000 centistokes | 14 |
| 54–61 mils plasticity (ASTM D926) | 3 |

EXAMPLE 5

Other compositions were made to compare the release characteristics of these materials to the materials encompassed by the invention.

(A) 20 g of a 2,000 centistoke α-ω hydroxyl endblocked polydimethylsiloxane was mixed with a stoichiometric excess (1 g) of the alkyltriacetoxysilane mixture described in Example 1, and diluted with methylene chloride. The solution was sprayed on an aluminum mold at 140° F. After 30 minutes the mixture was still uncured and did not release molded polyurethane foam articles which had been foam cured at 180° F. for 5–8 minutes in the coated mold.

(B) 20 g of a high molecular weight, α-ω hydroxyl end-blocked polydimethylsiloxane gum, a stoichiometric excess of alkyltriacetoxysilane (1 g), and 80 g of methylene chloride were mixed. The solution was applied to an aluminum mold in a thin layer at 140° F. After 30 minutes the resulting film was still uncured. The treated mold did not exhibit release characteristics when employed in polyurethane foam molding applications.

(C) 8 g of the gum used in Example 5c, which had a viscosity of about 60 mils, 2 g of ethylpolysilicate, 0.1 gram of dibutyltindiacetate employed to promote rapid curing, and methylene chloride were mixed and a small portion of the mixture was applied in a thin layer to the surface of an aluminum mold at 140° F. After 15 minutes the mixture had cured on the surface of the mold. The mold released cured polyurethane foam articles, but defoamed the surface of the articles.

(D) A mixture was prepared comprised of 9.7 g of α-ω hydroxyl end-blocked polydimethylsiloxane with an intrinsic viscosity of 2,000 centistokes, 0.3 gram of a methylhydrogensiloxane of the general formula

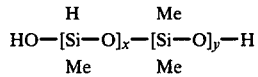

with a viscosity of about 30 to 40 centistokes, 0.1 gram dibutyltindioctoate, and methylene chloride. The mixture was applied as a thin coating on the face of an aluminum mold and cured at 140° F. for 15 minutes.

The treated mold severely defoamed molded polyurethane foam articles produced by the mold.

(E) D was repeated using a polydimethylsiloxane gum instead of the fluid. A mold treated with the cured composition gave three releases.

(F) 13.3 g of the polymer blend of Sample B, Example 1, and 6.7 g of methyltrimethoxysilane, and 0.6 g of tetraoctyltitinate were mixed with 80 g of naptha solvent. A thin coating of this mixture was cured for 15 minutes at 140° F. The treated mold defoamed molded polyurethane foam articles.

EXAMPLE 6

The composition used in Example 3 which contained 5 g of the alkyltriacetoxysilane was used to treat a tire mold. The treated mold released tires cured in the mold several times before the mold required retreatment.

What is claimed is:

1. A method for making molded articles which comprises coating at least one shape determining face of a mold with a composition comprising;

(I) polydimethylsiloxane of the formula

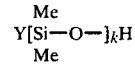

where Y is a methyl or hydroxyl radical with at least 80% of all Y being hydroxyl, and k has an average value of at least about 25;

(II) alkyltriacetoxysilane where the alkyl group is methyl, ethyl, or propyl, and;

(III) a nonreactive organic solvent, and (I) is present in about 5 to 20 parts by weight, (II) is present in about 1 to 20 parts by weight, and (III) is present in at least about equal parts by weight of the total weight of (I) and (II) combined, and the ratio of (II) to (I) by weight is at least 0.2;

curing said composition
   placing molding material in the mold;
   converting the molding material into a molded article; and
   removing the molded article from the mold.

2. The method of claim 1 wherein the composition additionally comprises a condensation catalyst (IV).

3. The method of claim 1 wherein the polydimethylsiloxane (I) of the composition is a mixture of polydimethylsiloxane polymers comprising;

(A) polydimethylsiloxane with an average k between about 25 and 80; and
   (B) polydimethylsiloxane with an average k between about 300 and 1000.

4. The method of claim 3 wherein the composition also comprises a condensation catalyst (IV).

5. The method of claim 3 wherein the ratio of (A) to (B) by weight is between about 0.1 and 10.

6. The method of claim 4 wherein the ratio of (A) to (B) by weight is between about 0.1 and 10.

7. The method of claim 6 wherein the alkyltriacetoxysilane (II) in the composition is a mixture of methyltriacetoxysilane and ethyltriacetoxysilane in about equal parts by weight.

8. The method of claim 7 where the condensation catalyst is chosen from the group consisting of dibutyltindiacetate, dibutyltindilaurate, dibutyltindioctoate, dimethyltindineodeconoate, stannous octoate, di-N-octyltin-S,S-di-iso-octyl mercapto acetate, dibutyltin-S,S-dimethylmercapto acetate, or diethyltin-S,S-dibutylmercapto acetate, and is present in about 0.01 to 2.0 parts by weight to 100 parts by weight of the total of (I) and (II).

9. The method of claim 8 wherein the molded article is made of a polyurethane foam and wherein the isocyanate used in molding material is selected from the group consisting of methylenediphenylisocyanates (MDI), tolylenediisocyanates (TDI), or polymeric isocyanates (PMDI).

10. A method for making molded articles which comprises coating at least one shape determining face of a mold with a composition comprising;
(I) a mixture of a high molecular weight polydimethylsiloxane and a low molecular weight polydimethylsiloxane, both of the formula $$Y[\underset{\text{Me}}{\overset{\text{Me}}{\text{Si}-\text{O}}}]_k H$$

where Y is a methyl or hydroxyl radical with at least 80% of all Y being hydroxyl, the low molecular weight polydimethylsiloxane (A) has a value of k between 25 and 80, the high molecular weight polydimethylsiloxane (B) has an average value of k between about 300 and 1000, and the weight ratio of (A) to (B) is less than 0.5;
(II) alkyltriacetoxysilane where the alkyl group is methyl, ethyl, or propyl, and;
(III) a nonreactive organic solvent,
(IV) a condensation catalyst which decreases the time required to cure the composition in the presence of water; and (I) is present in about 5 to 20 parts by weight, (II) is present in about 1 to 20 parts by weight, and (III) is present in at least about equal parts by weight of the total weight of (I) and (II) combined;
curing said composition;
placing molding material in the mold; and,
removing the molded article from the mold.

11. The method of claim 10 wherein the weight ratio of (II) to (I) is at least 0.1.

* * * * *